(12) United States Patent
Kudla et al.

(10) Patent No.: US 11,550,044 B2
(45) Date of Patent: Jan. 10, 2023

(54) DIRT DETECTOR ON A LIDAR SENSOR WINDOW

(71) Applicant: Infineon Technologies AG, Neubiberg (DE)

(72) Inventors: Wojciech Kudla, Wageningen (NL); Hendrikus Van Lierop, Bj Weert (NL)

(73) Assignee: Infineon Technologies AG, Neubiberg (DE)

( * ) Notice: Subject to any disclaimer, the term of this patent is extended or adjusted under 35 U.S.C. 154(b) by 408 days.

(21) Appl. No.: 16/744,886

(22) Filed: Jan. 16, 2020

(65) Prior Publication Data

US 2021/0223374 A1 Jul. 22, 2021

(51) Int. Cl.
*G01S 7/497* (2006.01)
*G01S 7/481* (2006.01)
*G01S 7/4863* (2020.01)

(52) U.S. Cl.
CPC ............ *G01S 7/497* (2013.01); *G01S 7/4813* (2013.01); *G01S 7/4817* (2013.01); *G01S 7/4863* (2013.01); *G01S 2007/4977* (2013.01)

(58) Field of Classification Search
CPC ...... G01S 7/497; G01S 7/4813; G01S 7/4817; G01S 7/4863; G01S 2007/4977; G01S 17/42
See application file for complete search history.

(56) References Cited

U.S. PATENT DOCUMENTS

| 9,096,323 B1 | 8/2015 | Ray et al. |
| 2008/0158555 A1 | 7/2008 | Mori |
| 2019/0241158 A1 | 8/2019 | Ghannam et al. |
| 2019/0250259 A1 | 8/2019 | Cienfuegos et al. |

FOREIGN PATENT DOCUMENTS

| EP | 2189815 A1 * | 5/2010 | ........... G01S 17/936 |
| WO | 2018230255 A1 | 12/2018 | |

* cited by examiner

*Primary Examiner* — Tony Ko
(74) *Attorney, Agent, or Firm* — Harrity & Harrity, LLP

(57) ABSTRACT

A sensor module includes a window structure configured to permit the passage of transmitted light and received light between an inside of the sensor module and a field-of-view; a transmitter configured to transmit a transmit light beam; a scanning structure configured to rotate about at least one scanning axis, the scanning structure configured to receive the transmit light beam from the transmitter and direct the transmit light beam towards the window structure and the field-of-view; a light detector configured to detect a reflected light beam that corresponds to the transmit light beam; and at least one processor configured to measure a time-of-flight of a round trip light beam comprising of the transmit light beam and the reflected light beam, compare the time-of-flight to a threshold time, and detect a dirt formation on the window structure on a condition that the time-of-flight is less than the threshold time.

29 Claims, 6 Drawing Sheets

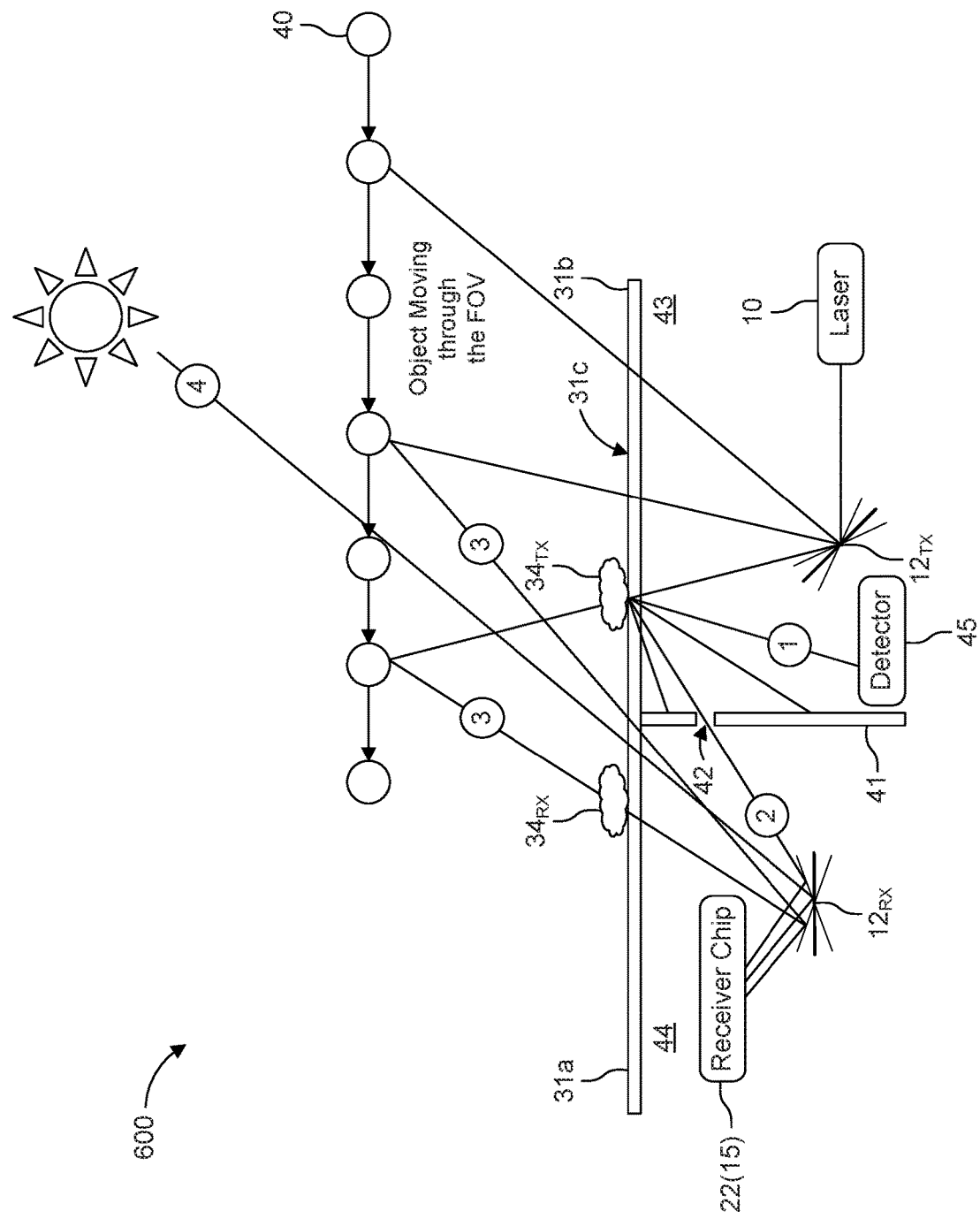

DIRT DETECTOR ON A LIDAR SENSOR WINDOW

FIELD

The present disclosure relates generally to a device and to methods for detecting dirt on a Light Detection and Ranging (LIDAR) sensor window.

BACKGROUND

Light Detection and Ranging (LIDAR), is a remote sensing method that uses light in the form of a pulsed laser to measure ranges (variable distances) to one or more objects in a field of view. In particular, light is transmitted towards the object. Single photodetectors or arrays of photodetectors receive reflections from objects illuminated by the light, and the time it takes for the reflections to arrive at various sensors in the photodetector array is determined. This is also referred to as measuring time-of-flight (ToF). LIDAR systems form depth measurements and make distance measurements by mapping the distance to objects based on the time-of-flight computations. Thus, the time-of-flight computations can create distance and depth maps, which may be used to generate images.

LIDAR sensors may fire light as a narrow laser beam at different horizontal or vertical positions in a field of view. The light is transmitted and received through a window of the sensor module that provides an interface between the sensor module and the environment. This window may accumulate dirt over time, which may obscure the transmission and/or reception of the light. Cleaning of the window can be costly, as it may require wipers, compressed air, and/or cleaning fluids, as well as delivery systems for the cleaning mechanisms.

Therefore, an improved cleaning mechanism that mitigates cost may be desirable.

SUMMARY

According to one or more embodiments, a Light Detection and Ranging (LIDAR) sensor module includes a receiver compartment; a transmitter compartment; a housing that houses the receiver compartment and the transmitter compartment, the housing including a window structure configured to permit the passage of transmitted light from the transmitter compartment into a field-of-view and permit the passage of received light from the field-of-view into the receiver compartment; a transmitter arranged in the transmitter compartment and configured to transmit a transmit light beam; a scanning structure arranged in the transmitter compartment and configured to rotate about at least one scanning axis, the scanning structure configured to receive the transmit light beam from the transmitter and direct the transmit light beam towards the window structure and the field-of-view; a photodetector array arranged in the receiver compartment configured to receive the received light from the field-of-view; a light detector arranged in the transmitter compartment configured to detect a first reflected light beam that corresponds to the transmit light beam; and at least one processor configured to measure a first time-of-flight of a first round trip light beam including of the transmit light beam and the first reflected light beam, compare the first time-of-flight to a first threshold time, and detect a dirt formation on the window structure on a condition that the first time-of-flight is less than the first threshold time.

According to one or more embodiments, a method of detecting dirt on a window structure of a LIDAR sensor module is provided. The method includes transmitting a transmit light beam at a scanning structure arranged in the transmitter compartment of the LIDAR sensor module; rotating the scanning structure about at least one scanning axis; directing, by the scanning structure, the transmit light beam towards the window structure and a field-of-view; detecting, within the transmitter compartment, a first reflected light beam that corresponds to the transmit light beam; measuring a first time-of-flight of a first round trip light beam including of the transmit light beam and the first reflected light beam; comparing the first time-of-flight to a first threshold time; and detecting a dirt formation on the window structure on a condition that the first time-of-flight is less than the first threshold time.

According to one or more embodiments, a LIDAR sensor module includes a receiver compartment; a transmitter compartment; a housing that houses the receiver compartment and the transmitter compartment, the housing including a window structure configured to permit the passage of transmitted light from the transmitter compartment into a field-of-view and permit the passage of received light from the field-of-view into the receiver compartment; a transmitter arranged in the transmitter compartment and configured to transmit a transmit light beam; a scanning structure arranged in the transmitter compartment and configured to rotate about at least one scanning axis, the scanning structure configured to receive the transmit light beam from the transmitter and direct the transmit light beam towards the window structure and the field-of-view; a photodetector array arranged in the receiver compartment configured to detect a reflected light beam that corresponds to the transmit light beam; and at least one processor configured to measure a time-of-flight of a round trip light beam including of the transmit light beam and the reflected light beam, compare the time-of-flight to a threshold time, and detect a dirt formation on the window structure on a condition that the time-of-flight is less than the threshold time.

According to one or more embodiments, a LIDAR sensor module includes a housing including a window structure configured to permit the passage of transmitted light from inside the LIDAR sensor module into a field-of-view and permit the passage of received light from the field-of-view into the inside of the LIDAR sensor module; a transmitter configured to sequentially transmit a plurality of transmit light beams; a scanning structure configured to rotate about at least one scanning axis, the scanning structure configured to direct the plurality of transmit light beams at different lateral positions in the field-of-view, wherein the plurality of transmit light beams are configured to hit an object moving laterally across the field-of-view such that a plurality of reflected light beams are generated; a photodetector array configured to detect the plurality of reflected light beams; and at least one processor configured to detect a variation in amplitude of the plurality of reflected light beams, and detect a dirt formation on the window structure based on the detected variation.

BRIEF DESCRIPTION OF THE DRAWINGS

Embodiments are described herein making reference to the appended drawings.

FIG. 6 is a schematic diagram of another LIDAR sensor module with a dirt detection system according to one or more embodiments.

DETAILED DESCRIPTION

Figure 1:
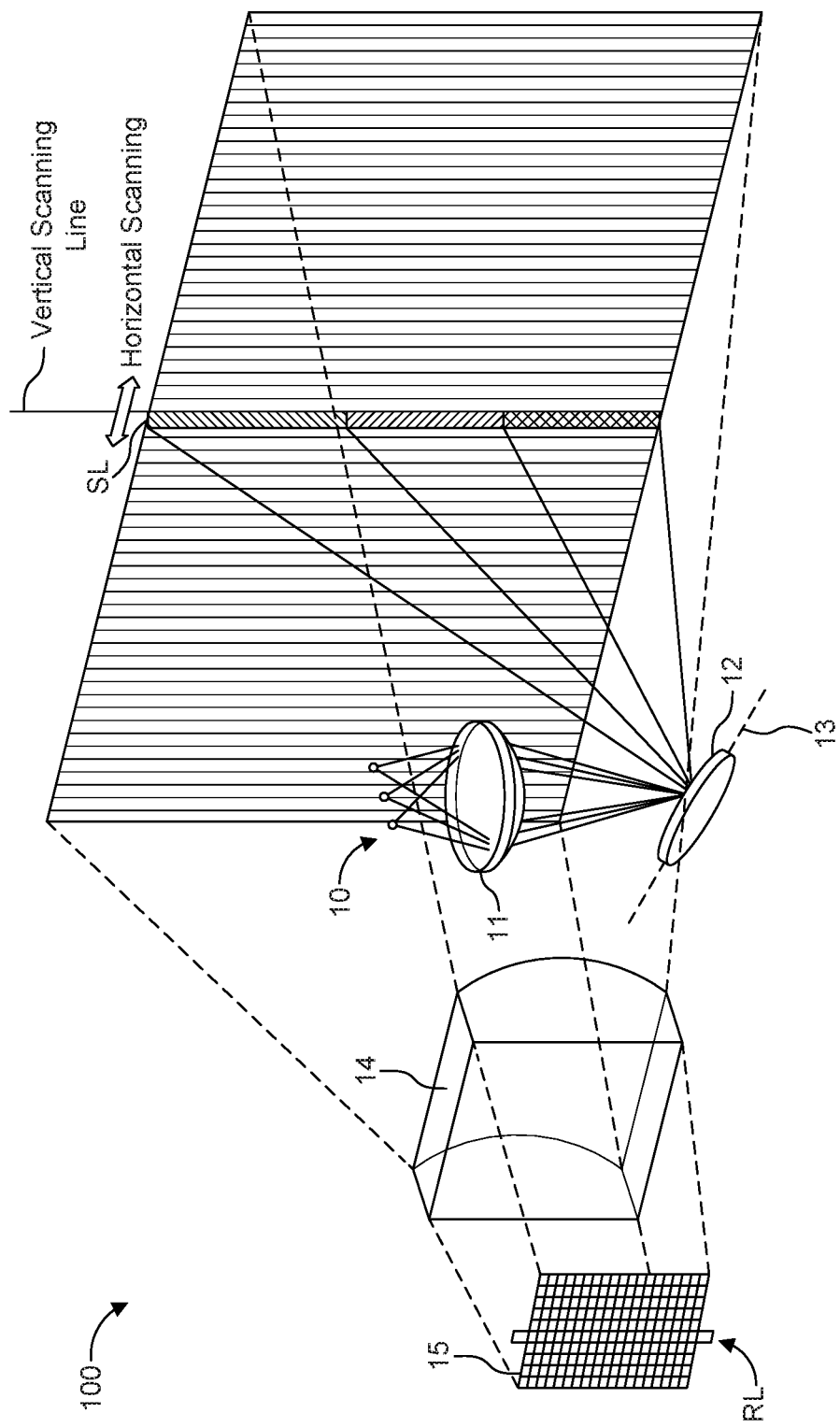
FIG. 1 is a schematic diagram of a LIDAR scanning system in accordance with one or more embodiments.

In the following, various embodiments will be described in detail referring to the attached drawings. It should be noted that these embodiments serve illustrative purposes only and are not to be construed as limiting. For example, while embodiments may be described as comprising a plurality of features or elements, this is not to be construed as indicating that all these features or elements are needed for implementing embodiments. Instead, in other embodiments, some of the features or elements may be omitted, or may be replaced by alternative features or elements. Additionally, further features or elements in addition to the ones explicitly shown and described may be provided, for example conventional components of sensor devices.

Features from different embodiments may be combined to form further embodiments, unless specifically noted otherwise. Variations or modifications described with respect to one of the embodiments may also be applicable to other embodiments. In some instances, well-known structures and devices are shown in block diagram form rather than in detail in order to avoid obscuring the embodiments.

Connections or couplings between elements shown in the drawings or described herein may be wire-based connections or wireless connections unless noted otherwise. Furthermore, such connections or couplings may be direct connections or couplings without additional intervening elements or indirect connections or couplings with one or more additional intervening elements, as long as the general purpose of the connection or coupling, for example to transmit a certain kind of signal or to transmit a certain kind of information, is essentially maintained.

Embodiments relate to optical sensors and optical sensor systems and to obtaining information about optical sensors and optical sensor systems. A sensor may refer to a component which converts a physical quantity to be measured to an electric signal, for example a current signal or a voltage signal. The physical quantity may, for example, comprise electromagnetic radiation, such as visible light, infrared (IR) radiation, or other type of illumination signal, a current, or a voltage, but is not limited thereto. For example, an image sensor may be a silicon chip inside a camera that converts photons of light coming from a lens into voltages. The larger the active area of the sensor, the more light that can be collected to create an image.

A sensor device as used herein may refer to a device which comprises a sensor and further components, for example biasing circuitry, an analog-to-digital converter (ADC) or a filter. A sensor device may be integrated on a single chip, although in other embodiments a plurality of chips or also components external to a chip may be used for implementing a sensor device.

In Light Detection and Ranging (LIDAR) systems, a light source transmits light pulses into a field of view and the light reflects from one or more objects by backscattering. Each reflection from an object is referred to as a "hit." In particular, LIDAR is a direct time-of-flight (ToF) system in which the light pulses (e.g., laser beams of infrared light) are emitted into the field of view, and a pixel array detects and measures the reflected beams. For example, an array of photodetectors receives reflections from objects illuminated by the light.

Currently, a photodetector array may be used to measure the reflected light. The photodetector array may be a one-dimensional (1D) array that consists of multiple rows of photodetectors (pixels) arranged in a single column or a two-dimensional (2D) array that consists of multiple rows and columns of photodetectors arranged in a grid-like arrangement. In the case of a 1D array, each pixel may be readout as a measurement signal in the form of raw analog data. In the case of a 2D array, each pixel row or group of adjacent pixel rows may be readout as a measurement signal in the form of raw analog data. Thus, each measurement signal includes data from a single pixel or a group of pixels.

Differences in return times for each light pulse across multiple pixels of the pixel array can then be used to make digital 3D representations of an environment or to generate other sensor data. For example, the light source may emit a single light pulse, and a time-to-digital converter (TDC) electrically coupled to the pixel array may count from the time the light pulse is emitted, corresponding to a start signal, and record a time (i.e., a ToF hit time) the reflected light pulse is received at the receiver (i.e., at the pixel array), corresponding to a ToF hit signal. The "time-of-flight" of the light pulse is then translated into a distance based on each recorded ToF hit time. Multiple ToF hits are possible over a predefined measurement period. In this case, multiple TOF hit times are stored and the counter counts until the end of predefined measurement period, which is defined by a maximum distance to be observed.

In another example, an analog-to-digital converter (ADC) may be electrically coupled to the pixel array (e.g., indirectly coupled with intervening elements in-between) for pulse detection and ToF measurement. For example, an ADC may be used to estimate a time interval between start/ToF hit signals with an appropriate algorithm.

A scan such as an oscillating horizontal scan (e.g., from left to right and right to left of a field of view) can illuminate a scene in a continuous scan fashion. Each firing of the laser beam by the light sources can result in a scan line in the "field of view." By emitting successive light pulses in different scanning directions, an area referred to as the field of view can be scanned and objects within the area can be detected and imaged. Thus, the field of view represents a scanning plane having a center of projection. A raster scan could also be used.

FIG. 1 is a schematic diagram of a LIDAR scanning system 100 in accordance with one or more embodiments. The LIDAR scanning system 100 is an optical scanning device that includes a transmitter, including an illumination unit 10, a transmitter optics 11, and a one-dimensional (1D) MEMS mirror 12 (1D MEMS scanner), and a receiver, including a primary optics 14, and an optical receiver 15. The optical receiver 15 in the illustration is a 2D photodetector array 15 but may alternatively be a 1D photodetector array. The receiver may further include receiver circuitry, such as data acquisition/readout circuitry and data processing circuitry, as will be further described according to FIG. 2.

While horizontal scanning is depicted, the LIDAR scanning system 100 may be rotated to scan in a different scanning direction. For example, the LIDAR scanning system 100 may be rotated 90° to scan in the vertical direction instead of the horizontal direction.

The photodetector array 15, whether it be a 2D array or a 1D array, is arranged in such a manner that an intended field of view is mapped vertically on the vertical extension of the photodetector array 15. A received light beam will hit only a specific row or group or rows of the detector array depending on the triggered light source and the vertical angle of the received light beam. The intended field of view may be further mapped horizontally on the horizontal extension of a pixel column, in the case of a 1D photodetector array, or mapped horizontally on the horizontal extension of a 2D photodetector array. Thus, in a system that uses a 1D photodetector array, each received light beam (i.e., each receiving line RL) is projected onto the column of the detector array. In a system that uses a 2D photodetector array, each received light beam (i.e., each receiving line RL) is projected onto one of the columns of the detector array.

In this example, the illumination unit 10 is a laser array that includes three light sources (e.g., laser diodes, light emitting diodes, or laser channels) that are linearly aligned in single bar formation and are configured to transmit light used for scanning the field of view for objects. The light emitted by the light sources is typically infrared light although light with another wavelength might also be used. As can be seen in the embodiment of FIG. 1, the shape of the light emitted by the light sources is spread in a direction perpendicular to a scanning direction to form a light beam with an oblong shape extending, lengthwise, perpendicular to the scanning direction. The illumination light transmitted from the light sources are directed towards the transmitter optics 11 configured to focus each laser onto a one-dimensional MEMS mirror 12. The transmitter optics 11 may be, for example, a lens or a prism.

When reflected by the MEMS mirror 12, the light from the light sources are aligned vertically to form, for each emitted laser shot, a one-dimensional vertical scanning line SL of infrared light or a vertical bar of infrared light. Each light source of the illumination unit 10 contributes to a different vertical region of the vertical scanning line SL. Thus, the light sources may be concurrently activated and concurrently deactivated to obtain a light pulse with multiple vertical segments, where each vertical segment corresponds to a respective light source, However, each vertical region or segment of the vertical scanning line SL may also be independently active or inactive by turning on or off a corresponding one of the light sources of the illumination unit 10. Thus, a partial or full vertical scanning line SL of light may be output from the system 100 into the field of view.

Accordingly, the transmitter of the system 100 is an optical arrangement configured to generate laser beams based on the laser pulses, the laser beams having an oblong shape extending in a direction perpendicular to a scanning direction of the laser beams. As can be seen from FIG. 1, each of the light sources is associated with a different vertical region in the field of view such that each light source illuminates a vertical scanning line only into the vertical region associated with the light source. For example, the first light source illuminates into a first vertical region and the second light sources illuminates into a second vertical region which is different from the first vertical region.

Sequential scanning may be implemented by the transmitter via the controller in that one vertical region in the field of view is illuminated at a time. In particular, one light source may be activated while all other light sources are deactivated. Thus, the plurality of light sources are sequentially activated in this manner to sequentially transmit at different vertical regions in the field of view.

In addition, while three laser sources are shown, it will be appreciated that the number of laser sources is configurable and is not limited thereto. For instance, the vertical scanning line SL may be generated by two or more laser sources.

In one example, 32 pixels may be arranged in a single pixel column and eight light sources may be used. In this case, each light source corresponds to one of eight different vertical regions of the field of view. Thus, each light source may also be mapped to a different group of four pixels (i.e., four pixel rows), wherein each group is mutually exclusive. In essence, each group of pixel is mapped to one of eight different vertical regions of the field of view. Different groups of pixels can be fired at by activating its corresponding light source, whereas other groups may not be fired at by deactivating its corresponding light source.

The MEMS mirror 12 is a mechanical moving mirror (i.e., a MEMS micro-mirror) integrated on a semiconductor chip (not shown). The MEMS mirror 12 according to this embodiment is configured to rotate about a single scanning axis and can be said to have only one degree of freedom for scanning. Distinguished from 2D-MEMS mirrors (2D MEMS scanners), in the 1D MEMS mirror, the single scanning axis is fixed to a non-rotating substrate and therefore maintains its spatial orientation during the oscillation of the MEMS mirror. Due to this single scanning axis of rotation, the MEMS mirror 12 is referred to as a 1D MEMS mirror or 1D MEMS scanner. However, it will be appreciated that a 2D MEMS mirror that has two degrees of freedom based on two scanning axes may be used in the LIDAR scanning system 100 instead of a 1D MEMS mirror.

The MEMS mirror 12 is configured to oscillate "side-to-side" about a single scanning axis 13 such that the light reflected from the MEMS mirror 12 (i.e., the vertical scanning line of light) oscillates back and forth in a horizontal scanning direction. A scanning period or an oscillation period is defined, for example, by one complete oscillation from a first edge of the field of view (e.g., left side) to a second edge of the field of view (e.g., right side) and then back again to the first edge. A mirror period of the MEMS mirror 12 corresponds to a scanning period.

Thus, the field of view is scanned in the horizontal direction by the vertical bar of light by changing the angle of the MEMS mirror 12 on its scanning axis 13. For example, the MEMS mirror 12 may be configured to oscillate between +/−15 degrees in a horizontal scanning direction to steer the light over +/−30 degrees (i.e., 60 degrees) making up the horizontal scanning range of the field of view. In this case, transmission optics (not illustrated) are used to extend the field of view by increasing (e.g., doubling) the angular range of transmitted light from the MEMS mirror 12.

Thus, the field of view may be scanned, line-by-line, by a rotation of the MEMS mirror 12 though its degree of motion. One such sequence though the degree of motion (e.g., from −15 degrees to +15 degrees or vice versa) is referred to as a single scan. Thus, two scans are used for each scanning period. Different regions (e.g., different vertical regions) of the field of view may be targeted during each scan or scanning period. Multiple scans may be used to generate distance and depth maps, as well as 3D images by a processing unit.

While the transmission mirror is described in the context of a MEMS mirror, it will be appreciated that other mirrors can also be used. In addition, the degree of rotation is not limited to +/−15 degrees, and the field of view may be increased or decreased according to the application. Thus, a one-dimensional scanning mirror is configured to oscillate about a single scanning axis and direct the laser beams at different directions into a field of view. Hence, a transmission technique includes transmitting the beams of light into the field of view from a transmission mirror that oscillates about a single scanning axis such that the beams of light are projected as a vertical scanning line SL into the field of view that moves horizontally across the field of view as the transmission mirror oscillates about the single scanning axis.

LIDAR systems using 1D-scanning mirrors can use a more relaxed shot-rate of the illumination unit 10 (i.e., transmitter) compared to 2D-scanning mirrors which use laser points for scanning the field of view which requires more shots for the transmitter to scan a field of view. In addition, LIDAR systems using 1D-scanning mirrors are typically more robust against shock and vibrations when compared to 2D-scanning mirrors and are therefore well suited for automotive applications.

Upon impinging one or more objects, the transmitted bar of vertical light is reflected by backscattering back towards the LIDAR scanning system 100 as a reflected vertical line where the second optical component 14 (e.g., a lens or prism) receives the reflected light. The second optical component 14 directs the reflected light onto the photodetector array 15 that receives the reflected light as a receiving line RL and is configured to generate electrical measurement signals. For example, second optical component 14 projects the received reflected light onto targeted pixels of the pixel array 15. However, as will be discussed, non-targeted pixels may also receive reflected light due to optical crosstalk (e.g., due to a reflection by a retro-reflector). The electrical measurement signals may be used for generating a 3D map of the environment and/or other object data based on the reflected light (e.g., via TOF calculations and processing).

The receiving line RL is shown as a vertical column of light that extends along the pixel column in a lengthwise direction of the pixel column. The receiving line has three vertical regions that correspond to the vertical regions of the vertical scanning line SL shown in FIG. 1. As the vertical scanning line SL moves horizontally across the field of view, each light beam (i.e., each receiving line RL) is projected onto the column of the detector array 15. The transmission direction of the scanning line SL set by the rotation angle of the MEMS mirror 12 is mapped to an image column of an image structure mapped to the field of view.

The photodetector array 15 can be any of a number of photodetector types; including avalanche photodiodes (APD), photocells, and/or other photodiode devices. Imaging sensors such as charge-coupled devices (CCDs) can be the photodetectors. In the examples provided herein, the photodetector array 15 is a one-dimensional (1D) APD array that comprises an array of APD pixels arranged in a single column. As provided herein, "photodiodes" and "pixels" are used interchangeably.

Moreover, the pixels of the photodetector array 15 may be selectively enabled and disabled or fixedly enabled. Each pixel may be assigned and coupled to a readout channel so that a signal can be read out from an activated pixel.

Thus, in some cases, a subset of the pixels may be selectively enabled at any time, depending on the transmission angle of the transmitted beam, while the remaining pixels are deactivated. Thus, different columns or rows of pixels may be sequentially activated/deactivated as the transmission direction changes (i.e., as the rotation angle of the MEMS mirror 12 changes). Thus, not all pixels are read out for each discrete transmission angle of the MEMS mirror 12.

Alternatively, all pixels may be fixedly activated and are capable of being readout at all times via a corresponding readout channel. Thus, all pixels can be read out for each discrete transmission angle of the MEMS mirror 12.

The photodetector array 15 receives reflective light pulses as the receiving line RL and generates electrical signals in response thereto. Since the time of transmission of each light pulse from the illumination unit 10 is known, and because the light travels at a known speed, a time-of-flight computation using the electrical signals can determine the distance of objects from the photodetector array 15. A depth map can plot the distance information.

In one example, for each distance sampling, a controller triggers a laser pulse from each of the light sources of the illumination unit 10 and also starts a timer in a Time-to-Digital Converter (TDC) Integrated Circuit (IC). This can also be performed using a field-programmable gate array (FPGA). The laser pulse is propagated through the transmission optics, reflected by the target field, and captured by one or more receiving photodiodes of the photodetector array 15. Each receiving photodiode emits a short electrical pulse that is read out by the analog readout circuit. Each signal that is read out of the analog readout circuit may be amplified by an electrical signal amplifier.

A comparator IC recognizes the pulse and sends a digital signal to the TDC to capture the timer value corresponding to the ToF hit time to capture the time-of-flight. The TDC uses a clock frequency to calibrate each measurement. The TDC sends the serial data of the differential time between the start and ToF hit digital signals to the controller, which filters out any error reads, averages multiple time measurements, and calculates the distance to the target at that particular field position. By emitting successive light pulses in different directions established by the MEMS mirror 12, an area (i.e., a field of view) can be scanned, a three-dimensional image can be generated, and objects within the area can be detected.

The signal processing chain of the receiver may also include an ADC for each photodiode. The ADC is configured to convert the analog electrical signals from the photodiode into a digital signal that is used for further data processing.

In addition, instead of using the TDC approach, ADCs may be used for signal detection and ToF measurement. For example, each ADC may be used detect an analog electrical signal from one or more photodiodes to estimate a time interval between a start signal (i.e., corresponding to a timing of a transmitted light pulse) and a ToF hit signal (i.e., corresponding to a timing of receiving an analog electrical signal at an ADC) with an appropriate algorithm.

When a pulse of laser energy as a vertical scanning line SL enters the field of view from the surface of MEMS mirror 12, reflective pulses appear when the laser light illuminates an object in the field of view. These reflective pulses arrive at the photodetector array 15 as a bar of light that may span vertically across one or more pixels. That is, all photodetector pixels in a pixel column (e.g., if all light sources are triggered) or a portion of the photodetector pixels (e.g., if only a portion of the light sources are triggered) may receive reflected laser light. For example, in one instance, all light sources of the illumination unit 10 may be used to generate the scanning line SL/receiving line RL. In this case, the receiving line RL may extend along the full pixel column in the lengthwise direction. In another instance, only a subset of the light sources may be used to generate the scanning line SL/receiving line RL. In this case, the receiving line may extend along only a portion of the pixel column in the lengthwise direction.

The photodetector array 15 is configured to generate measurement signals (electrical signals) used for generating a 3D map of the environment based on the received reflected light and the transmission angle/direction of a corresponding transmitted beam (e.g., via TOF calculations and processing). While not shown, the LIDAR scanning system 100 may also include a digital micromirror device (DMD) and a secondary optics (e.g., a lens, a total internal reflection (TIR) prism, or a beam splitter) that are configured to initially receive the reflected light through the primary optics 14, and redirect the received reflected light towards the photodetector array 15. For example, the DMD would first receive the reflected light pulse from the primary optics, and deflect the received reflected light through the secondary optics (e.g., a lens, a total internal reflection (TIR) prism, or a beam splitter) onto the photodetector array 15. In this case, the photodetector array 15 would still receive a vertical column of light, as described above.

Figure 2:
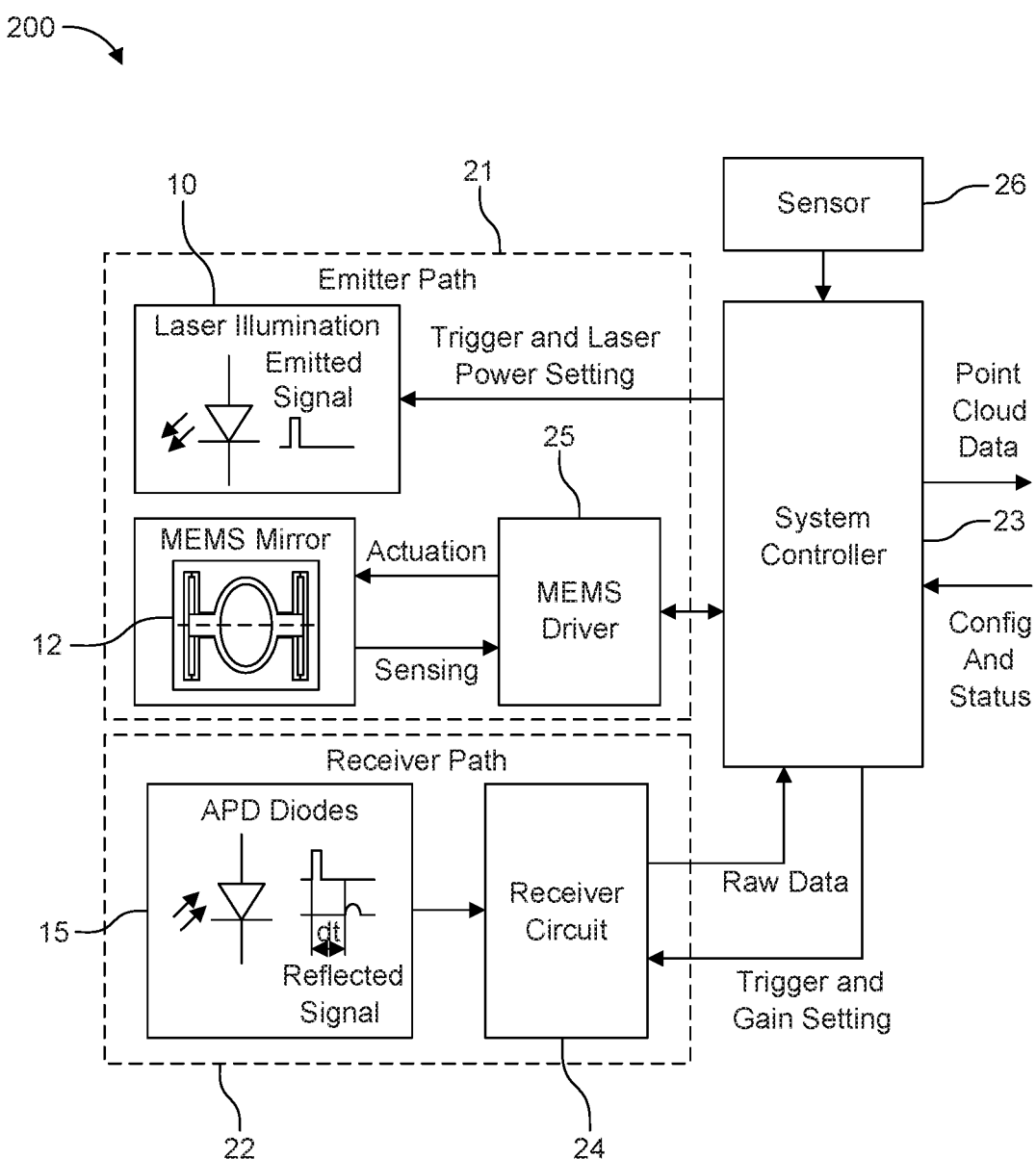
FIG. 2 is a schematic block diagram of a LIDAR scanning system in accordance with one or more embodiments.

FIG. 2 is a schematic block diagram of the LIDAR scanning system 200 in accordance with one or more embodiments. In particular, FIG. 2 shows additional features of the LIDAR scanning system 200, including example processing and control system components such as a MEMS driver, a receiver circuit, and a system controller.

The LIDAR scanning system 200 includes a transmitter unit 21 that is responsible for an emitter path of the system 200, and a receiver unit 22 that is responsible for a receiver path of the system 200. The system also includes a system controller 23 that is configured to control components of the transmitter unit 21 and the receiver unit 22, and to receive raw data from the receiver unit 22 and perform processing thereon (e.g., via digital signal processing) for generating object data (e.g., point cloud data). Thus, the system controller 23 includes at least one processor and/or processor circuitry (e.g., comparators and digital signal processors (DSPs), a dedicated IC, or a FPGA) of a signal processing chain for processing data, as well as control circuitry, such as a controller, that is configured to generate control signals. The controller may be a FPGA that generates the control signals. The LIDAR scanning system 200 may also include a sensor 26, such as a temperature sensor, that provides sensor information to the system controller 23.

The transmitter unit 21 includes the illumination unit 10, the MEMS mirror 12, and a MEMS driver 25 configured to drive the MEMS mirror 12. In particular, the MEMS driver 25 actuates and senses the rotation position of the mirror, and provides position information (e.g., tilt angle or degree of rotation about the rotation axis) of the mirror to the system controller 23. Based on this position information, the laser sources of the illumination unit 10 are triggered by the system controller 23 and the photodiodes are activated to sense, and thus measure, a reflected light signal. Thus, a higher accuracy in position sensing of the MEMS mirror results in a more accurate and precise control of other components of the LIDAR system.

The receiver unit 22 is a receiver chip that includes the photodetector array 15 as well as a receiver circuit 24 that includes an analog readout circuit, including transimpedance amplifiers (TIAs), and a digital readout circuit, including analog-to-digital converters (ADCs).

The analog readout circuit includes N analog output channels (e.g., 32 channels) each configured to read out measurement signals received from an assigned pixel of the photodetector array 15. One acquisition of analog data from the photodetector array 15 on an analog output channel may be referred to as an analog sample, and each analog output channel may be used to acquire different analog samples. Each sample further corresponds to a sample time, at which time measurement signals are read out from the corresponding pixel.

Thus, the receiver circuit 24 may receive the analog electrical signals from the photodetectors of the photodetector array 15 and transmit the electrical signals as raw analog data to a single bit or a multibit ADC. A single bit ADC outputs a one bit signal each time a TOF hit is detected. The one bit signal simply indicates that a reflected signal pulse was received. In contrast, a multibit ADC outputs a multibit signal that additionally includes amplitude information corresponding to the intensity of the reflected signal pulse.

Prior to the ADC receiving the electrical signals, the electrical signals from each channel may pass through a corresponding amplifier (e.g., a transimpedance amplifier (TIA)) of N amplifiers that converts the electrical signals from, for example, current into voltage. In the case of one bit signal processing, a TIA may be used without an external ADC coupled thereto. TIAs have a comparator at their output, which is a one-bit ADC. Thus, an additional ADC external to the TIA is not needed in this circumstance and only a TIA may be used.

Thus, each TIA and each ADC are incorporated in the receiver circuit 24. One acquisition of ADC data may be referred to as an ADC sample, which may also be referred to as a digital sample. Each sample further corresponds to a sample time, at which time measurement signals are read out from one or more pixels.

The ADCs are configured to convert the raw analog data into raw digital data for transmission to the system controller 23, which performs further processing on the raw digital data, including averaging and pulse detection, crosstalk analysis and mitigation, and generating 3D point cloud data. Thus, each of the analog output channels is coupled to a corresponding ADC of N ADCs that is configured to convert the analog data from a respective analog output channel into digital data. As a result, the receiver circuit 24 also includes a digital readout circuit of N digital output channels, each being coupled to a different corresponding analog output channel via a different corresponding ADC.

The receiver circuit 24 may also receive trigger control signals from the system controller 23 that triggers an activation of all the photodetectors for a measurement period. The receiver circuit 24 may also receive gain setting control signals for controlling the gain of one or more photodetectors.

The system controller 23 includes signal processing circuitry that receives the raw digital data as well as serial data of a differential time between start and ToF hit digital signals generated by an ADC, and uses the received data to calculate time-of-flight information for each field position within the field of view, to generate object data (e.g., point cloud data), and to generate a 3D point cloud.

Acquired LIDAR data includes data from a reflected object signal, originating from a LIDAR transmitted laser beam reflecting off an object, and a noise signal, originating from other light sources such as ambient light (e.g., from the sun). Ambient noise typically has a smaller magnitude when compared to a reflected object laser signal.

Figure 3:
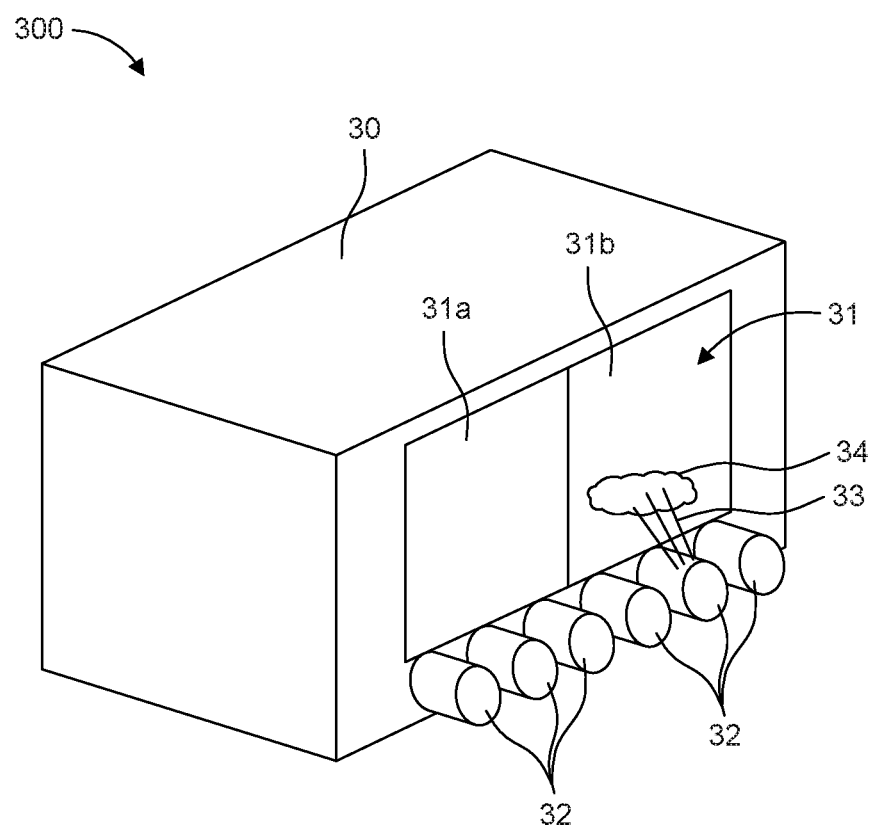
FIG. 3 is a perspective view of a LIDAR sensor module 300 according to one or more embodiments.

FIG. 3 is a perspective view of a LIDAR sensor module 300 according to one or more embodiments. The LIDAR sensor module 300 includes a housing 30 that houses the LIDAR scanning system 200. The housing 30 includes a window 31 that is configured to transmit light therethrough, including transmit (TX) laser light, receive (RX) laser light, and ambient light. The window 31 may be a glass substrate or other transparent material.

Furthermore, the window 31 may include a TX portion 31a and an RX portion 31b. The TX portion 31a of the window 31 is arranged to receive TX laser light from the LIDAR scanning system 200 and permit the passage of the TX laser light into the environment (i.e., into the field of view). The RX portion 31b of the window 31 is arranged to receive RX laser light as reflected light from the environment and permit the passage of the RX laser light to the LIDAR scanning system 200. In addition, ambient light may be received from the environment through one or both the TX portion 31a and the RX portion 31b. The TX portion 31a and the RX portion 31b may be referred to as a TX window and an RX window, respectfully. A window 31 also includes a main surface 31c.

The LIDAR sensor module 300 also includes a plurality of nozzles 32 that are configured to dispense a cleaning fluid directed at the window 31. The plurality of nozzles 32 are arranged on the housing 30 along a perimeter of the window 31. Thus, each nozzle 32 is configured to direct cleaning fluid 33 at a different sub-area of the window 31. When dirt 33 is detected in one or more sub-areas of the window 31, the corresponding nozzle or nozzles 32 may be activated to spray and thus clean the affected sub-area or sub-areas. The nozzles 32 are each independently controlled by the system controller 23 based on the dirt detection in the one or more sub-areas of the window 31.

Figure 4:
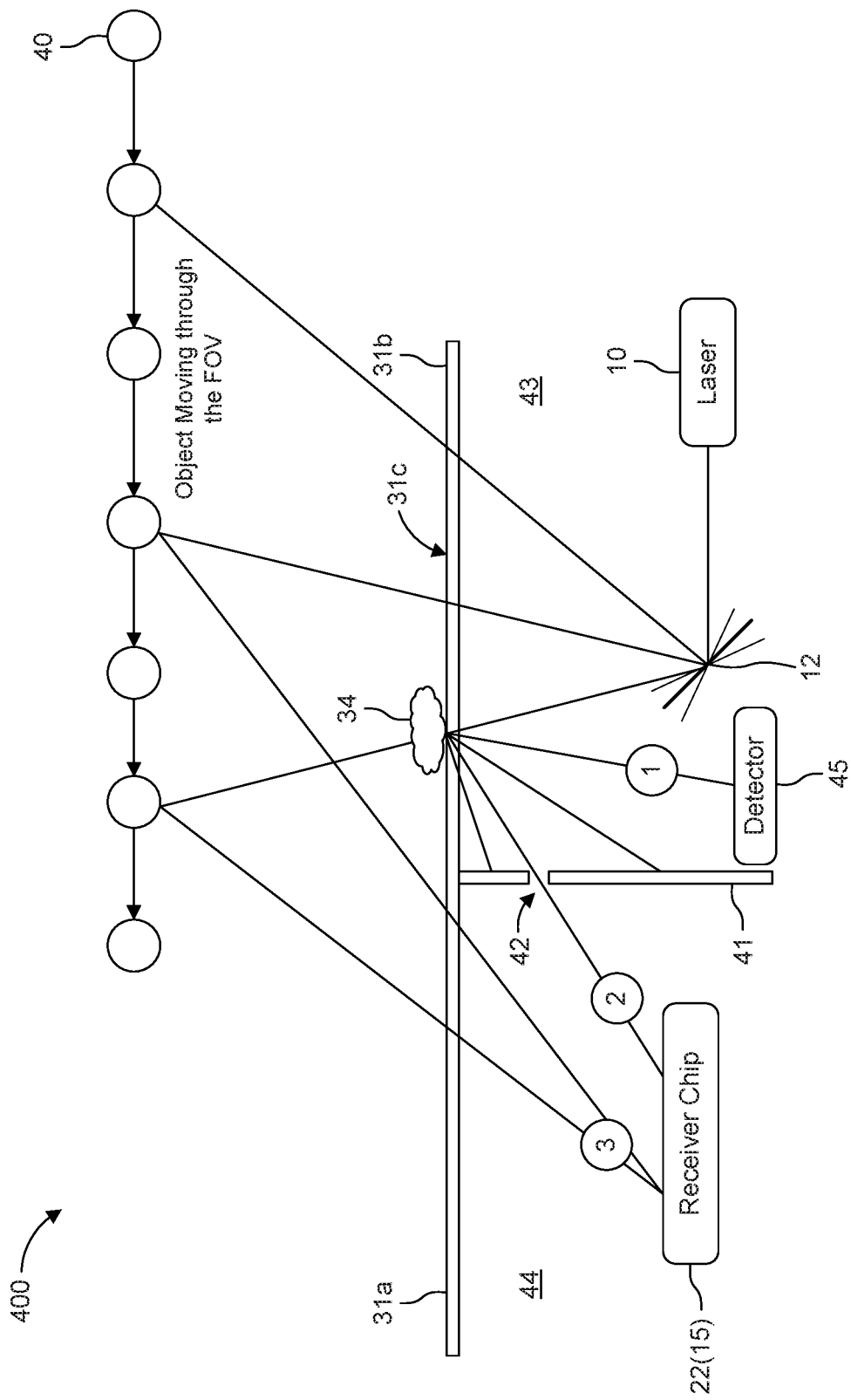
FIG. 4 is a schematic diagram of a LIDAR sensor module with a dirt detection system according to one or more embodiments.

FIG. 4 is a schematic diagram of a LIDAR sensor module 400 with a dirt detection system according to one or more embodiments. The LIDAR sensor module 400 includes components similarly described above, including an illumination unit 10 that transmits TX laser beams, a MEMS mirror 12 that scans TX laser light beams across a field of view, a receiver chip 22 that includes a photodetector array 15 for detecting light, and a window 31 having a TX portion 31a and an RX portion 31b.

The LIDAR sensor module 400 may further include a compartment separator 41 that may include an aperture 42 that may be a hole, a slit, or a transparent region. The compartment separator 41 is a structure, such as a wall, that separates the sensor module into a TX 43 compartment and an RX compartment 44. The TX compartment 43 houses TX components such as the illumination unit 10 and the transmission mirror 12 and the RX compartment 44 houses RX components such as the receiver chip 12. The compartment separator 41 is arranged to prevent light leakage into the RX compartment 44 from the TX compartment 43. That is, the compartment separator 41 is configured to prevent light from the TX compartment 43 from leaking into the RX compartment 44, with the exception of a controlled light leakage through the aperture 42. In this regard, the compartment separator 41 may also be referred to as a light filter comprising the aperture 42.

In the case that the aperture 42 is a transparent region, the compartment separator 41 may be formed such that the transparent region is partially transparent to light. Thus, only a portion of light incident at the transparent region may be transmitted through the transparent region into the RX compartment 44. This is contrasted with a hole or a slit, where the light passes through the hole or slit unaltered in amplitude.

The LIDAR sensor module 400 further includes a TX-side light detector 45 (e.g., a photodetector or a pin diode) that is used in one of the techniques for detecting dirt on the TX portion 31a of the window 31. The TX-side light detector 45 may be electrically connected to the system controller 23 such that electrical signals generated by the TX-side light detector 45 can be used by the system controller 23 for detecting dirt.

In addition, FIG. 4 illustrates three dirt detection techniques (1), (2), and (3) for detecting dirt on the window 31. The three dirt detection techniques (1), (2), and (3) designate three different return paths for laser light that are used for detecting dirt on the window 31.

In technique (1), the illumination unit 10 fires a laser beam and the TX-side light detector 45 is configured to detect backscattered light within the TX compartment 43. For example, if dirt exists on the TX portion 31a of the window 31, a portion of the laser beam will be backscattered back into the TX compartment 43. In response to receiving backscattered light 1, the TX-side light detector 45 generates an electrical signal, which is received by the system controller 23. The system controller 23 is configured to calculate a time-of-flight of the light beam based on the transmission time of the initial light beam and the detection time of the backscattered light 1. The system controller 23 then compares the time-of-flight with a threshold time.

There may always be some portion of light that is backscattered regardless of the cleanliness of the window or the existence of an anti-reflective coating. Thus, the system controller 23 may also measure an amplitude of the received backscattered light 2 and compare the amplitude to a minimum threshold amplitude in combination with the time-of-flight comparison.

On a condition that the time-of-flight is less than the threshold time, the system controller 23 determines that there is dirt present on the TX portion 31a of the window 31. For example, the threshold time may be a short time frame selected to correspond to a strong echo resultant from a backscattering of the light at the TX portion 31a of the window 31. The short time frame may correspond to a time it takes for light to travel a distance from the illumination unit 10 to the MEMS mirror 12 to the window 31 to the TX-side light detector 45. As one example, the threshold time may be 0.5 ns corresponding to about 7.5 cm of travel distance.

Dirt detection may further be conditional on the measured amplitude exceeding a minimum threshold amplitude to filter out false detections. That is, in order for dirt to be detected, the time-of-flight must be less than the threshold time and the measured amplitude must exceed a minimum threshold amplitude.

If dirt is detected using technique (1), the system controller 23 may also determine the sub-area of the window on which the dirt is present. The system controller 23 may do so based on the rotation angle of the MEMS mirror 12 at the time of firing the laser beam from the illumination unit 10. This rotation angle may be referred to as the transmission rotation angle and corresponds to a transmission direction of the light beam that is tracked by the system controller 23. Thus, each sub-area of the window may be mapped to a transmission rotation angle or a set of transmission rotation angles of the MEMS mirror 12. Accordingly, when dirt is detected, the transmission rotation angle corresponding to the transmitted light beam may be used by the system controller 23 to determine the corresponding sub-area of the window 31 and activate a corresponding nozzle 32 for dispensing cleaning fluid 33.

On the other hand, on a condition that the time-of-flight is equal to or greater than the threshold time, the system controller 23 determines that there is no dirt present and ignores the light detection.

In technique (2), the illumination unit 10 fires a laser beam and the photodetector array 15 is configured to detect backscattered light within the RX compartment 44 as a result of the controlled light leakage through the aperture 42. For example, if dirt exists on the TX portion 31a of the window 31, a portion of the laser beam will be backscattered back into the TX compartment 43, which may further enter the RX compartment 44 via aperture 42. Upon entering the RX compartment 44, the backscattered light 2 is detected by the photodetector array 15, or by a dedicated detector or pin-diode (similar to a detector 45 in the TX compartment).

In response to receiving backscattered light 2, the photodetector array 15 generates an electrical signal, which is received by the system controller 23. The system controller 23 is configured to calculate a time-of-flight of the light beam based on the transmission time of the initial light beam and the detection time of the backscattered light 2. The system controller 23 then compares the time-of-flight with a threshold time.

There may always be some portion of light that is backscattered regardless of the cleanliness of the window or the existence of an anti-reflective coating. Thus, the system controller 23 may also measure an amplitude of the received backscattered light 2 and compare the amplitude to a minimum threshold amplitude in combination with the time-of-flight comparison.

On a condition that the time-of-flight is less than the threshold time, the system controller 23 determines that there is dirt present on the TX portion 31a of the window 31. Dirt detection may further be conditional on the measured amplitude exceeding a minimum threshold amplitude to filter out false detections. As similarly described above in reference to technique (1), the threshold time may be a short time frame selected to correspond to a strong echo resultant from a backscattering of the light at the TX portion 31a of the window 31. The short time frame may correspond to a time it takes for light to travel a distance from the illumination unit 10 to the MEMS mirror 12 to the window 31 to the photodetector 15. As one example, the threshold time may be 0.5 ns corresponding to about 7.5 cm of travel distance. As can be appreciated, the travel distances in technique (1) and technique (2) may be substantially equal or the longer of the two may be used. Thus, a single threshold time may be used in both techniques. Alternatively, different threshold times may be used to account for different travel distances between components.

If dirt is detected using technique (2), the system controller 23 may also determine the sub-area of the window on which the dirt is present based on the transmission rotation angle of the MEMS mirror 12, as similarly described in reference to technique (1).

On the other hand, on a condition that the time-of-flight is equal to or greater than the threshold time, the system controller 23 determines that there is no dirt present and ignores the light detection.

In technique (3), the illumination unit 10 fires multiple laser beams while the MEMS mirror 12 rotates through a plurality of transmission angles and the photodetector array 15 detects reflected laser pulses 3 that are backscattered by an object 40 that is moving laterally across the field of view. Each reflected laser pulse 3 corresponds to a different transmission angle and a different lateral position of the object 40. Here, moving laterally across the field of view means that the object 40 maintains a constant distance from the LIDAR sensor module 400 as it moves from one side of the field of view to the opposite side of the field of view. Thus, the path of the object moving laterally across the field-of-view is parallel to a main surface 31c of the window 31.

The photodetector array 15 generates electrical signals based on the reflected laser pulses 3 and the system controller 23 monitors the amplitude of a reflected laser pulses 3 by monitoring the amplitude of the electrical signals. Ideally, the amplitude should be substantially constant (i.e., within a narrow tolerance range) since the object distance, and thus the time-of-flight, remains constant. However, dirt on either the TX portion 31a or the RX portion 31b of the window will impact the amplitude since some transmission losses will be caused by the dirt.

Thus, the system controller 23 monitors for and detects a variation in the amount of light returned from an object in the scene, depending on the lateral position of the object (which corresponds to an angular position of the MEMS mirror 12). At transmission angles at which there is dirt on a corresponding sub-area of the window 31, the amplitude of the reflected laser pulse 3 will appear dimmer and consequently have a lower amplitude when compared to other transmission angles at which there is no dirt on a corresponding sub-area of the window 31.

The system controller 23 records the amplitude of each reflected laser pulse 3, compares each amplitude to a threshold value, and, if an amplitude is less than the threshold value, detects dirt. One way of doing this is to calculate an average of the recorded amplitudes and set the threshold value to be less than the average by a predetermined amount.

Alternatively, since the object likely spans multiple pixels of the photodetector array 15, the amplitude of the received light 3 varies from pixel to pixel. This produces a "grayscale image" of the object for each laser pulse, depending on features of the object. However, this gray scale image will change at each transmission angle as the object moves through the FOV, appearing dimmer at those angular positions where dirt is present at the TX portion 31a and/or the RX portion 31b of the window 31. Thus, each gray scale image may be compared to a threshold value, and those determined to be less than the threshold value are flagged for dirt detection.

In both alternatives, the transmission angle of the MEMS mirror 12 is known by the system controller 23 when a dim reflected light beam is received from the field of view. Since each transmission angle is mapped to sub-areas in both the TX portion 31a and the RX portion 31b of the window 31, nozzles 32 corresponding to the sub-areas in both the TX portion 31a and/or the RX portion 31b of the window 31 are activated by the system controller 23. However, it is noted that the system controller 23 is unable to discriminate whether dirt is present only on the TX portion 31a or the RX portion 31b. Thus, a sub-area in each of the TX portion 31a and the RX portion 31b corresponding to each dirt detection is cleaned.

Figure 5:
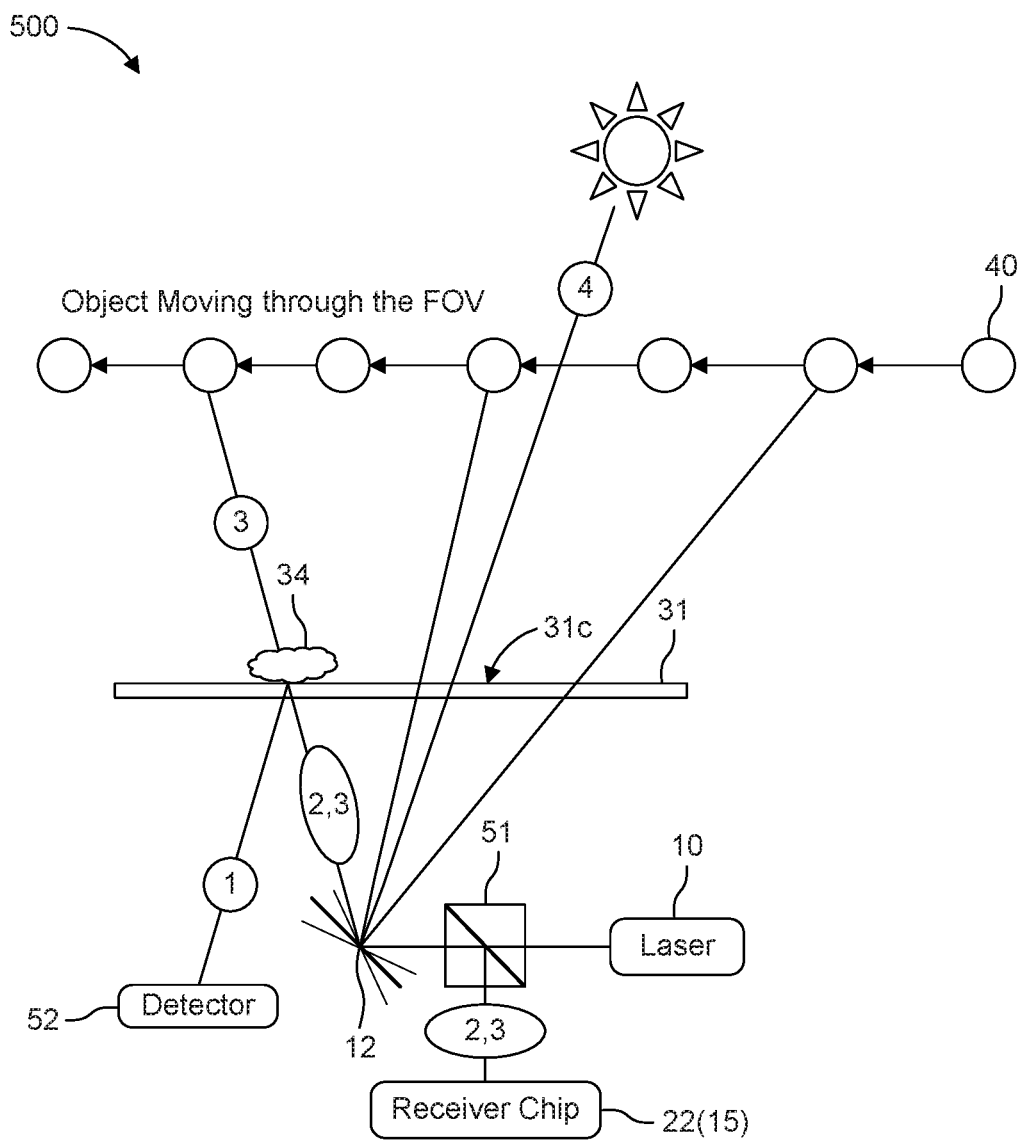
FIG. 5 is a schematic diagram of another LIDAR sensor module with a dirt detection system according to one or more embodiments.

FIG. 5 is a schematic diagram of a LIDAR sensor module 500 with a dirt detection system according to one or more embodiments. The LIDAR sensor module 500 includes components similarly described above, including an illumination unit 10 that transmits TX laser beams, a MEMS mirror 12 that scans TX laser light beams across a field of view, a receiver chip 22 that includes a photodetector array 15 for detecting light, and a window 31.

However, unlike the LIDAR sensor module 400, the LIDAR sensor module 500 is a monostatic (co-axial) sensor module. The co-axial sensor module is configured for both transmission and reception of laser beams using a single transmission/receiving mirror 12. The MEMS mirror 12 is constantly rotating (oscillating) during a scanning operation and particularly during a time-of-flight of a light beam.

The co-axial sensor module 500 further includes a beam management system including an optical beam splitter 51. The beam splitter 51 is an optical device that splits a beam of light (i.e., incident light) in two, which may or may not have the same optical power (i.e., signal strength). The illumination unit 10 is configured to transmit light beams at the beam splitter 51 and the beam splitter transmits a portion of each light beam to the MEMS mirror 12. The MEMS mirror 12, in turn, acting as a transmission mirror transmits each light beam from the illumination unit 10 as a TX light beam. A reflected light beam (i.e., an RX light beam) may be received by the MEMS mirror 12 acting as a receiving mirror, which in turn directs each RX light beam at the beam splitter 51. The beam splitter 51, in turn, transmits a portion of each RX light beam to the photodetector array 15 for detection. Thus, the beam splitter 51 is arranged in a transmit beam path of a TX light beam and in a receive beam path of a RX light beam, where the TX and RX paths are shared.

The LIDAR sensor module 500 further includes a light detector 52 (e.g., a photodetector or a pin diode) that is used in one of the techniques for detecting dirt on the window 31. The light detector 52 may be electrically connected to the system controller 23 such that electrical signals generated by the light detector 52 can be used by the system controller 23 for detecting dirt.

In addition, FIG. 5 illustrates four dirt detection techniques (1), (2), (3), and (4) for detecting dirt on the window 31. The four dirt detection techniques (1), (2), (3), and (4) designate four return paths for laser light that are used for detecting dirt on the window 31.

In technique (1), the illumination unit 10 fires a laser beam and the light detector 52 is configured to detect backscattered light within sensor module. For example, if dirt exists on the sub-area of the window 31 corresponding to the transmission angle of the MEMS mirror 12, a portion of the laser beam will be backscattered back into the sensor module towards the light detector 52. In response to receiving backscattered light 1, the light detector 52 generates an electrical signal, which is received by the system controller 23. The system controller 23 is configured to calculate a time-of-flight of the light beam based on the transmission time of the initial light beam and the detection time of the backscattered light 1. The system controller 23 then compares the time-of-flight with a threshold time.

On a condition that the time-of-flight is less than the threshold time, the system controller 23 determines that there is dirt present on the sub-area of the window 31. For example, the threshold time may be a short time frame selected to correspond to a strong echo resultant from a backscattering of the light at the window 31. The short time frame may correspond to a time it takes for light to travel a distance from the illumination unit 10 to the MEMS mirror 12 to the window 31 to the light detector 52. As one example, the threshold time may be 0.5 ns corresponding to about 7.5 cm of travel distance.

Dirt detection may further be conditional on the measured amplitude exceeding a minimum threshold amplitude to filter out false detections. That is, in order for dirt to be detected, the time-of-flight must be less than the threshold time and the measured amplitude must exceed a minimum threshold amplitude.

If dirt 34 is detected using technique (1), the system controller 23 may also determine the sub-area of the window on which the dirt is present. The system controller 23 may do so based on the rotation angle (i.e., transmission angle) of the MEMS mirror 12 at the time of firing the laser beam from the illumination unit 10. Thus, each sub-area of the window may be mapped to a transmission rotation angle or a set of transmission rotation angles of the MEMS mirror 12. Accordingly, when dirt is detected, the transmission rotation angle corresponding to the transmitted light beam may be used by the system controller 23 to determine the corresponding sub-area of the window 31 and activate a corresponding nozzle 32 for dispensing cleaning fluid 33.

On the other hand, on a condition that the time-of-flight is equal to or greater than the threshold time, the system controller 23 determines that there is no dirt present and ignores the light detection.

In technique (2), the illumination unit 10 fires a laser beam and light scattered by the dirt 34 will follow the same path back as would light reflected from an object in the field of view. In other words, the backscattered light 2 is reflected back by the dirt 34 along the RX path, onto the MEMS mirror 12 which directs the backscattered light 2 towards the photodetector array 15 via the beam splitter 51. Similar to technique (1), the photodetector array 15 generates an electrical signal, which is received by the system controller 23. The system controller 23 is configured to calculate a time-of-flight of the light beam based on the transmission time of the initial light beam and the detection time of the backscattered light 2. The system controller 23 then compares the time-of-flight with a threshold time.

On a condition that the time-of-flight is less than the threshold time, the system controller 23 determines that there is dirt present on the sub-area of the window 31. For example, the threshold time may be a short time frame selected to correspond to a strong echo resultant from a backscattering of the light at the window 31. The short time frame may correspond to a time it takes for light to travel a distance of the internal TX and RX paths. As one example, the threshold time may be 0.5 ns corresponding to about 7.5 cm of travel distance. As can be appreciated, the travel distances in technique (1) and technique (2) may be substantially equal or the longer of the two may be used. Thus, a single threshold time may be used in both techniques. Alternatively, different threshold times may be used to account for different travel distances between components.

Dirt detection may further be conditional on the measured amplitude exceeding a minimum threshold amplitude to filter out false detections. That is, in order for dirt to be detected, the time-of-flight must be less than the threshold time and the measured amplitude must exceed a minimum threshold amplitude.

If dirt is detected using technique (2), the system controller 23 may also determine the sub-area of the window on which the dirt is present based on the transmission rotation angle of the MEMS mirror 12, as similarly described in reference to technique (1).

On the other hand, on a condition that the time-of-flight is equal to or greater than the threshold time, the system controller 23 determines that there is no dirt present and ignores the light detection.

In technique (3), the illumination unit 10 fires multiple laser beams while the MEMS mirror 12 rotates through a plurality of transmission angles and the photodetector array 15 detects reflected laser pulses 3 that are backscattered by an object 40 that is moving laterally across the field of view. Each reflected laser pulse 3 corresponds to a different transmission angle and a different position of the object 40. Here, moving laterally across the field of view means that the object 40 maintains a constant distance from the LIDAR sensor module 500 as it moves from one side of the field of view to the opposite side of the field of view.

It is noted that in a co-axial arrangement, a reflected laser pulse 3 follows the same path as its transmit beam counterpart. As a result, localized dirt on the window 31 will dim both the outgoing as well as the incoming light beam, reducing the amplitude of a round trip beam twice.

The photodetector array 15 generates electrical signals based on the reflected laser pulses 3 and the system controller 23 monitors the amplitude of a reflected laser pulses 3 by monitoring the amplitude of the electrical signals. Ideally, the amplitude should be substantially constant (i.e., within a narrow tolerance range) since the object distance, and thus the time-of-flight, remains constant. However, dirt on the window 31 will impact the amplitude since transmission losses will be caused by the dirt 34.

Thus, the system controller 23 monitors for and detects a variation in the amount of light returned from an object in the scene, depending on the lateral position of the object (which corresponds to an angular position of the MEMS mirror 12). At transmission angles at which there is dirt on a corresponding sub-area of the window 31, the amplitude of the reflected laser pulse 3 will appear dimmer and consequently have a lower amplitude when compared to other transmission angles at which there is no dirt on a corresponding sub-area of the window 31.

The system controller 23 records the amplitude of each reflected laser pulse 3, compares each amplitude to a threshold value, and, if an amplitude is less than the threshold value, detects dirt. One way of doing this is to calculate an average of the recorded amplitudes and set the threshold value to be less than the average by a predetermined amount.

Alternatively, since the object likely spans multiple pixels of the photodetector array 15, the amplitude of the received light 3 varies from pixel to pixel. This produces a "gray-scale image" of the object for each laser pulse, depending on features of the object. However, this gray scale image will change at each transmission angle as the object moves through the FOV, appearing dimmer at those angular positions where dirt is present at the window 31. Thus, each gray scale image may be compared to a threshold value, and those determined to be less than the threshold value are flagged for dirt detection.

In both alternatives, the transmission angle of the MEMS mirror 12 is known by the system controller 23 when a dim reflected light beam is received from the field of view. Since each transmission angle is mapped to sub-areas of the window 31, nozzles 32 corresponding to the sub-area of the window 31 is activated by the system controller 23.

In technique (4), the illumination unit 10 is deactivated and the MEMS mirror 12 receives only ambient light 4. As the MEMS mirror 12 rotates, it directs the ambient light 4 for each rotation angle towards the photodetector array 15 via the beam splitter 51. By rotating from one maximum angular position to an opposite angular position (e.g., from a right extrema to a left extrema), the MEMS mirror 12 can sequentially scan all the different sub-areas of the window 31 using the ambient light 4.

The photodetector array 15 generates electrical signals corresponding to received ambient light 4 for each rotation angle of the MEMS mirror 12. In turn, the system controller 23 monitors and records the ambient light level (i.e., the amplitude) for each rotation angle. If an amplitude of a respective measurement is less than a threshold value, dirt is detected and the system controller 23 determines the sub-area of the window 31 to be cleaned based on the corresponding rotation angle.

One way of detecting dimmed ambient light this is to calculate an average of the recorded amplitudes and set the threshold value to be less than the average by a predetermined amount. The system controller 23 may also compensate for variations in the scene and the position of the sun in the scene.

FIG. 6 is a schematic diagram of a LIDAR sensor module 600 with a dirt detection system according to one or more embodiments. The LIDAR sensor module 600 includes components similarly described above, including an illumination unit 10 that transmits TX laser beams, a receiver chip 22 that includes a photodetector array 15 for detecting light, a window 31 having a TX portion 31a and an RX portion 31b, a compartment separator 41 that includes an aperture 42, and a TX-side light detector 45 (e.g., a photodetector or a pin diode).

However, unlike the LIDAR sensor modules 400 and 500, the LIDAR sensor module 600 is a bistatic sensor module comprising two compartments, a TX compartment 43 and an RX compartment 44, that each include a respective scanning mirror. In particular, the TX compartment 43 houses a TX scanning mirror $12_{TX}$ and the RX compartment 44 houses an RX scanning mirror $12_{RX}$. The TX scanning mirror $12_{TX}$ is configured to receive TX light beams from the illumination unit and direct the TX light beams towards the field of view and the RX scanning mirror $12_{RX}$ is configured to receive reflected light beams and direct them towards the photodetector array 15.

In addition, FIG. 6 illustrates four dirt detection techniques (1), (2), (3), and (4) for detecting dirt on the window 31. The four dirt detection techniques (1), (2), (3), and (4) designate four different return paths for laser light that are used for detecting dirt on the window 31.

In technique (1), the illumination unit 10 fires a laser beam and the TX-side light detector 45 is configured to detect backscattered light within the TX compartment 43, as was described in technique (1) of FIG. 4. For example, if dirt exists on the TX portion 31a of the window 31, a portion of the laser beam will be backscattered back into the TX compartment 43. In response to receiving backscattered light 1, the TX-side light detector 45 generates an electrical signal, which is received by the system controller 23. The system controller 23 is configured to calculate a time-of-flight of the light beam based on the transmission time of the initial light beam and the detection time of the backscattered light 1. The system controller 23 then compares the time-of-flight with a threshold time.

On a condition that the time-of-flight is less than the threshold time, the system controller 23 determines that there is dirt present on the TX portion 31a of the window 31. Dirt detection may further be conditional on the measured amplitude exceeding a minimum threshold amplitude to filter out false detections. That is, in order for dirt to be detected, the time-of-flight must be less than the threshold time and the measured amplitude must exceed a minimum threshold amplitude.

If dirt is detected using technique (1), the system controller 23 may also determine the sub-area of the window on which the dirt is present. The system controller 23 may do so based on the rotation angle of the TX scanning mirror $12_{TX}$ $12_{TX}$ at the time of firing the laser beam from the illumination unit 10. This rotation angle may be referred to as the transmission rotation angle and corresponds to a transmission direction of the light beam that is tracked by the system controller 23. Accordingly, when dirt is detected, the transmission rotation angle corresponding to the transmitted light beam may be used by the system controller 23 to determine the corresponding sub-area of the window 31 and activate a corresponding nozzle 32 for dispensing cleaning fluid 33.

On the other hand, on a condition that the time-of-flight is equal to or greater than the threshold time, the system controller 23 determines that there is no dirt present and ignores the light detection.

In technique (2), the illumination unit 10 fires a laser beam and the photodetector array 15 is configured to detect backscattered light within the RX compartment 44 as a result of the controlled light leakage through the aperture 42. For example, if dirt exists on the TX portion 31a of the window 31, a portion of the laser beam will be backscattered back into the TX compartment 43, which may further enter the RX compartment 44 via aperture 42. Upon entering the RX compartment 44, the backscattered light 2 is redirected by the RX scanning mirror $12_{RX}$ to the photodetector array 15 where the backscattered light 2 is detected.

In response to receiving backscattered light 2, the photodetector array 15 generates an electrical signal, which is received by the system controller 23. The system controller 23 is configured to calculate a time-of-flight of the light beam based on the transmission time of the initial light beam and the detection time of the backscattered light 2. The system controller 23 then compares the time-of-flight with a threshold time, as similarly described in reference to technique (2) in FIG. 4.

For example, on a condition that the time-of-flight is less than the threshold time, the system controller 23 determines that there is dirt present on the TX portion 31a of the window 31. As can be appreciated, the travel distances in technique (1) and technique (2) may be substantially equal or the longer of the two may be used. Thus, a single threshold time may be used in both techniques. Alternatively, different threshold times may be used to account for different travel distances between components.

Dirt detection may further be conditional on the measured amplitude exceeding a minimum threshold amplitude to filter out false detections. That is, in order for dirt to be detected, the time-of-flight must be less than the threshold time and the measured amplitude must exceed a minimum threshold amplitude.

If dirt is detected using technique (2), the system controller 23 may also determine the sub-area of the TX portion 31a of window 31 on which the dirt is present based on the transmission rotation angle of the TX scanning mirror $12_{TX}$ that corresponds to the transmitted light beam.

On the other hand, on a condition that the time-of-flight is equal to or greater than the threshold time, the system controller 23 determines that there is no dirt present and ignores the light detection.

In technique (3), the illumination unit 10 fires multiple laser beams while the MEMS mirror 12 rotates through a plurality of transmission angles and the photodetector array 15 detects reflected laser pulses 3 that are backscattered by an object 40 that is moving laterally across the field of view. Each reflected laser pulse 3 corresponds to a different transmission angle and a different position of the object 40. This technique is similar to technique (3) described in reference to FIG. 4, with the exception that the use of the two scanning mirrors 12TX and 12RX allows for locating dirt $34_{RX}$ on the RX portion 31a of the window 31 independently from locating dirt $34_{TX}$ on the TX portion 31b of the window 31 by using this technique (3) in combination with technique (1).

In particular, when dirt is detected using technique (3), the system controller 23 may also determine if dirt is detected using technique (1). In the affirmative case that dirt is detected using technique (1), the sub-area of the TX portion 31b for cleaning can be determined by the transmission angle of the TX scanning mirror $12_{TX}$. In the negative case that dirt is not detected using technique (1), the sub-area of the RX portion 31a for cleaning can be determined by the reception angle of the RX scanning mirror $12_{RX}$.

In technique (4), the illumination unit 10 is deactivated and the RX scanning mirror $12_{RX}$ receives only ambient light 4. This technique is similar to technique (4) described in reference to FIG. 5, with the exception that only dirt on the RX portion 31a of the window 31 can be detected. This is because the RX scanning mirror $12_{RX}$ only receives ambient light through the RX portion 31a of the window 31. Thus, the RX scanning mirror $12_{RX}$ is only configured to scan across the RX portion 31a of the window 31 for ambient light. As the RX scanning mirror $12_{RX}$ rotates, it directs the ambient light 4 for each reception rotation angle towards the photodetector array 15. By rotating from one maximum angular position to an opposite angular position (e.g., from a right extrema to a left extrema), the RX scanning mirror $12_{RX}$ can sequentially scan all the different sub-areas of the RX portion 31a of the window 31 using the ambient light 4.

The photodetector array 15 generates electrical signals corresponding to received ambient light 4 for each reception rotation angle of the MEMS mirror 12. In turn, the system controller 23 monitors and records the ambient light level (i.e., the amplitude) for each reception rotation angle. If an amplitude of a respective measurement is less than a threshold value, dirt is detected and the system controller 23 determines the sub-area of the window 31 to be cleaned based on the corresponding reception rotation angle.

One way of detecting dimmed ambient light this is to calculate an average of the recorded amplitudes and set the threshold value to be less than the average by a predetermined amount. The system controller 23 may also compensate for variations in the scene and the position of the sun in the scene.

Additional embodiments are provided below:

1. A coaxial Light Detection and Ranging (LIDAR) sensor module, comprising:

a housing comprising a window structure configured to permit the passage of transmitted light from inside the LIDAR sensor module into a field-of-view and permit the passage of received light from the field-of-view into the inside of the LIDAR sensor module;

a transmitter configured to transmit a transmit light beam along a transmit beam path;

a scanning structure configured to rotate about at least one scanning axis, the scanning structure being arranged on the transmit beam path and on a first receive beam path;

a photodetector array arranged at a terminal end of the first receive beam path, the photodetector array configured to detect a first reflected light beam that corresponds to the transmit light beam; and at least one processor configured to measure a first time-of-flight of a first round trip light beam comprising of the transmit light beam and the first reflected light beam, compare the first time-of-flight to a first threshold time, and detect a dirt formation on the window structure on a condition that the first time-of-flight is less than the first threshold time.

2. The coaxial LIDAR sensor module of embodiment 1, wherein:

the at least one processor configured to monitor at least one angular position of the scanning structure on the at least one scanning axis, determine the at least one angular position of the scanning structure that corresponds to a transmission time at which the transmit light beam is transmitted, localize the dirt formation to a sub-area of the window structure according to the determined at least one angular position of the scanning structure, and activate a cleaning mechanism assigned to the sub-area to clean the sub-area of the window structure.

3. The coaxial LIDAR sensor module of embodiment 1, further comprising:

a light detector arranged at a terminal end of a second receive beam path, the light detector configured to detect a second reflected light beam that corresponds to the transmit light beam, wherein the at least one processor configured to measure a second time-of-flight of a second round trip light beam comprising of the transmit light beam and the second reflected light beam, compare the second time-of-flight to a second threshold time, and detect the dirt formation on the window structure on a condition that the second time-of-flight is less than the second threshold time.

4. The coaxial LIDAR sensor module of embodiment 3, wherein the second receive beam path does not include the scanning structure.

5. The coaxial LIDAR sensor module of embodiment 3, wherein:

the at least one processor configured to monitor at least one angular position of the scanning structure on the at least one scanning axis, determine the at least one angular position of the scanning structure that corresponds to a transmission time at which the transmit light beam is transmitted, localize the dirt formation to a sub-area of the window structure according to the determined at least one angular position of the scanning structure, and activate a cleaning mechanism assigned to the sub-area to clean the sub-area of the window structure.

6. The coaxial LIDAR sensor module of embodiment 3, wherein the light detector and the photodetector array are separate light detection devices.

7. The coaxial LIDAR sensor module of embodiment 1, wherein:

the transmitter is configured to sequentially transmit a plurality of transmit light beams, the scanning structure is configured to direct the plurality of transmit light beams at different lateral positions in the field-of-view, wherein the plurality of transmit light beams are configured to hit an object moving laterally across the field-of-view such that a plurality of reflected light beams are generated, the photodetector array is configured to detect the plurality of reflected light beams, and the at least one processor configured is configured to detect a variation in amplitude of the plurality of reflected light beams, and detect the dirt formation on the window structure based on the detected variation.

8. The coaxial LIDAR sensor module of embodiment 7, wherein a path of the object moving laterally across the field-of-view is parallel to a main surface of the window structure.

9. The coaxial LIDAR sensor module of embodiment 7, wherein:

the at least one processor configured is configured to detect a dim reflected light beam among the plurality of reflected light beams based on the detected variation, determine a lateral angular position of the scanning structure that corresponds to the dim reflected light beam, localize the dirt formation to a sub-area of the window structure according to the determined lateral angular position of the scanning structure, and activate a cleaning mechanism assigned to the sub-area to clean the sub-area of the window structure.

10. The coaxial LIDAR sensor module of embodiment 1, wherein:

the scanning structure is configured to receive ambient light from the field-of-view at a plurality of scanning positions, and direct the ambient light for each of the plurality of scanning positions to the photodetector array, the photodetector array is configured to detect the ambient light for each of the plurality of scanning positions;

the at least one processor is configured to detect a variation in amplitude of the ambient light received among the plurality of scanning positions, and detect the dirt formation on the window structure based on the detected variation.

11. The coaxial LIDAR sensor module of embodiment 10, wherein:

the at least one processor is configured to deactivate the transmitter while receiving the ambient light for each of the plurality of scanning positions.

12. The coaxial LIDAR sensor module of embodiment 10, wherein:

the at least one processor configured is configured to detect dim ambient light among the ambient light for each of the plurality of scanning positions, determine a scanning position among the plurality of scanning positions that corresponds to the dim ambient light, localize the dirt formation to a sub-area of the window structure according to the determined scanning position, and activate a cleaning mechanism assigned to the sub-area to clean the sub-area of the window structure.

13. A bistatic Light Detection and Ranging (LIDAR) sensor module, comprising:

a receiver compartment;

a transmitter compartment;

a housing that houses the receiver compartment and the transmitter compartment, the housing comprising a window structure configured to permit the passage of transmitted light from the transmitter compartment into a field-of-view and permit the passage of received light from the field-of-view into the receiver compartment;

a transmitter arranged in the transmitter compartment and configured to transmit a transmit light beam;

a transmit scanning structure arranged in the transmitter compartment and configured to rotate about at least one transmit scanning axis, the transmit scanning structure configured to direct the transmit light beam towards the window structure and the field-of-view;

a photodetector array arranged in the receiver compartment configured to receive the received light from the field-of-view;

a receive scanning structure arranged in the receiver compartment and configured to rotate about at least one receive scanning axis, the receive scanning structure configured to direct the received light towards photodetector array;

a light detector arranged in the transmitter compartment configured to detect a first reflected light beam that corresponds to the transmit light beam; and at least one processor configured to measure a first time-of-flight of a first round trip light beam comprising of the transmit light beam and the first reflected light beam, compare the first time-of-flight to a first threshold time, and detect a first dirt formation on the window structure on a condition that the first time-of-flight is less than the first threshold time.

14. The bistatic LIDAR sensor module of embodiment 13, wherein:

the at least one processor configured to monitor at least one angular position of the transmit scanning structure on the at least one transmit scanning axis, determine the at least one angular position of the transmit scanning structure that corresponds to a transmission time at which the transmit light beam is transmitted, localize the first dirt formation to a sub-area of the window structure according to the determined at least one angular position of the transmit scanning structure, and activate a cleaning mechanism assigned to the sub-area to clean the sub-area of the window structure.

15. The bistatic LIDAR sensor module of embodiment 13, wherein:

the photodetector array is configured to detect a second reflected light beam that corresponds to the transmit light beam, and the at least one processor is configured to measure a second time-of-flight of a second round trip light beam comprising of the transmit light beam and the second reflected light beam, compare the second time-of-flight to a second threshold time, and detect the first dirt formation on the window structure on a condition that the second time-of-flight is less than the second threshold time.

16. The bistatic LIDAR sensor module of embodiment 15, wherein:

the at least one processor configured to monitor at least one angular position of the transmit scanning structure on the at least one transmit scanning axis, determine the at least one angular position of the transmit scanning structure that corresponds to a transmission time at which the transmit light beam is transmitted, localize the first dirt formation to a sub-area of the window structure according to the determined at least one angular position of the transmit scanning structure, and activate a cleaning mechanism assigned to the sub-area to clean the sub-area of the window structure.

17. The bistatic LIDAR sensor module of embodiment 15, further comprising:

a separator structure interposed between the receiver compartment and the transmitter compartment in order to separate the receiver compartment and the transmitter compartment, wherein the separator structure includes an aperture configured to control a light leakage between the receiver compartment and the transmitter compartment.

18. The bistatic LIDAR sensor module of embodiment 17, wherein photodetector array is configured to receive the second reflected light beam from the transmitter compartment via the aperture and the receive scanning structure.

19. The bistatic LIDAR sensor module of embodiment 15, wherein:

the receive scanning structure is configured to receive the second reflected light beam from the transmitter compartment, wherein the second reflected light beam is backscattered by the window structure, and the receive scanning structure is configured to direct the second reflected light beam towards the photodetector array.

20. The bistatic LIDAR sensor module of embodiment 13, wherein:

the transmitter is configured to sequentially transmit a plurality of transmit light beams, the transmit scanning structure is configured to direct the plurality of transmit light beams at different lateral positions in the field-of-view, wherein the plurality of transmit light beams are configured to hit an object moving laterally across the field-of-view such that a plurality of reflected light beams are generated, the photodetector array is configured to detect the plurality of reflected light beams, and the at least one processor configured is configured to detect a variation in amplitude of the plurality of reflected light beams, and detect the first dirt formation on the window structure based on the detected variation.

21. The bistatic LIDAR sensor module of embodiment 20, wherein a path of the object moving laterally across the field-of-view is parallel to a main surface of the window structure.

22. The bistatic LIDAR sensor module of embodiment 20, wherein:

the at least one processor configured is configured to detect a dim reflected light beam among the plurality of reflected light beams based on the detected variation, determine a lateral angular position of the transmit scanning structure that corresponds to the dim reflected light beam, localize the first dirt formation to a sub-area of the window structure according to the determined lateral angular position of the transmit scanning structure, and activate a cleaning mechanism assigned to the sub-area to clean the sub-area of the window structure.

23. The bistatic LIDAR sensor module of embodiment 20, wherein:

the at least one processor configured is configured to detect a dim reflected light beam among the plurality of reflected light beams based on the detected variation, determine a lateral angular position of the receive scanning structure that corresponds to the dim reflected light beam, localize a second dirt formation to a sub-area of the window structure according to the determined lateral angular position of the transmit scanning structure, and activate a cleaning mechanism assigned to the sub-area to clean the sub-area of the window structure.

24. The bistatic LIDAR sensor module of embodiment 13, wherein:

the receive scanning structure is configured rotate through a plurality of scanning positions, receive ambient light from the field-of-view at the plurality of scanning positions, and direct the ambient light for each of the plurality of scanning positions to the photodetector array, the photodetector array is configured to detect the ambient light for each of the plurality of scanning positions;

the at least one processor is configured to detect a variation in amplitude of the ambient light received among the plurality of scanning positions, and detect the dirt formation on the window structure based on the detected variation.

25. The bistatic LIDAR sensor module of embodiment 24, wherein:

the at least one processor is configured to deactivate the transmitter while receiving the ambient light for each of the plurality of scanning positions.

26. The bistatic LIDAR sensor module of embodiment 24, wherein:

the at least one processor configured is configured to detect dim ambient light among the ambient light for each of the plurality of scanning positions, determine a scanning position among the plurality of scanning positions that corresponds to the dim ambient light, localize the dirt formation to a sub-area of the window structure according to the determined scanning position, and activate a cleaning mechanism assigned to the sub-area to clean the sub-area of the window structure.

Although some aspects have been described in the context of an apparatus, it is clear that these aspects also represent a description of the corresponding method, where a block or device corresponds to a method step or a feature of a method step. Analogously, aspects described in the context of a method step also represent a description of a corresponding block or item or feature of a corresponding apparatus. Some or all of the method steps may be executed by (or using) a hardware apparatus, like for example, a microprocessor, a programmable computer, or an electronic circuit. In some embodiments, some one or more of the method steps may be executed by such an apparatus.

Depending on certain implementation requirements, embodiments provided herein can be implemented in hardware or in software. The implementation can be performed using a digital storage medium, for example a floppy disk, a DVD, a Blu-Ray, a CD, a ROM, a PROM, an EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Instructions may be executed by one or more processors, such as one or more central processing units (CPU), digital signal processors (DSPs), general purpose microprocessors, application specific integrated circuits (ASICs), field programmable logic arrays (FPGAs), or other equivalent integrated or discrete logic circuitry. Accordingly, the term "processor," as used herein refers to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The above described exemplary embodiments are merely illustrative. It is understood that modifications and variations of the arrangements and the details described herein will be apparent to others skilled in the art. It is the intent, therefore, to be limited only by the scope of the impending patent claims and not by the specific details presented by way of description and explanation of the embodiments herein.

What is claimed is:

1. A Light Detection and Ranging (LIDAR) sensor module, comprising:
   a receiver compartment;
   a transmitter compartment;
   a housing that houses the receiver compartment and the transmitter compartment, the housing comprising a window structure configured to permit a passage of transmitted light from the transmitter compartment into a field-of-view and permit a passage of received light from the field-of-view into the receiver compartment;
   a transmitter arranged in the transmitter compartment and configured to transmit a transmit light beam;
   a scanning structure arranged in the transmitter compartment and configured to rotate about at least one scanning axis, the scanning structure configured to receive the transmit light beam from the transmitter and direct the transmit light beam towards the window structure and the field-of-view;
   a photodetector array arranged in the receiver compartment configured to receive the received light from the field-of-view;
   a light detector arranged in the transmitter compartment configured to detect a first reflected light beam that corresponds to the transmit light beam; and
   at least one processor configured to measure a first time-of-flight of a first round trip light beam comprising of the transmit light beam and the first reflected light beam, compare the first time-of-flight to a first threshold time, and detect a dirt formation on the window structure based on a condition that the first time-of-flight is less than the first threshold time.

2. The LIDAR sensor module of claim 1, wherein the at least one processor is configured to measure an amplitude of the first reflected light beam, compare the measured amplitude to a minimum amplitude threshold, and detect the dirt formation on the window structure on a condition that the measured amplitude is greater than the minimum amplitude threshold.

3. The LIDAR sensor module of claim 1, wherein:
   the at least one processor is configured to monitor at least one angular position of the scanning structure on the at least one scanning axis, determine the at least one angular position of the scanning structure that corresponds to a transmission time at which the transmit light beam is transmitted, localize the dirt formation to a sub-area of the window structure according to the determined at least one angular position of the scanning structure, and activate a cleaning mechanism assigned to the sub-area to clean the sub-area of the window structure.

4. The LIDAR sensor module of claim 1, wherein:
   the photodetector array is configured to detect a second reflected light beam that corresponds to the transmit light beam, and
   the at least one processor is configured to measure a second time-of-flight of a second round trip light beam comprising of the transmit light beam and the second reflected light beam, compare the second time-of-flight to a second threshold time, and detect the dirt formation on the window structure on a condition that the second time-of-flight is less than the second threshold time.

5. The LIDAR sensor module of claim 4, wherein the at least one processor is configured to measure an amplitude of the second reflected light beam, compare the measured amplitude to a minimum amplitude threshold, and detect the dirt formation on the window structure based on a condition that the measured amplitude is greater than the minimum amplitude threshold.

6. The LIDAR sensor module of claim 4, wherein:
   the at least one processor is configured to monitor at least one angular position of the scanning structure on the at least one scanning axis, determine the at least one angular position of the scanning structure that corresponds to a transmission time at which the transmit light beam is transmitted, localize the dirt formation to a sub-area of the window structure according to the determined at least one angular position of the scanning structure, and activate a cleaning mechanism assigned to the sub-area to clean the sub-area of the window structure.

7. The LIDAR sensor module of claim 4, further comprising:
   a separator structure interposed between the receiver compartment and the transmitter compartment in order to separate the receiver compartment and the transmitter compartment, wherein the separator structure includes an aperture configured to control a light leakage between the receiver compartment and the transmitter compartment.

8. The LIDAR sensor module of claim 7, wherein photodetector array is configured to receive the second reflected light beam from the transmitter compartment via the aperture.

9. The LIDAR sensor module of claim 1, wherein:
the transmitter is configured to sequentially transmit a plurality of transmit light beams,
the scanning structure is configured to direct the plurality of transmit light beams at different lateral positions in the field-of-view, wherein the plurality of transmit light beams are configured to hit an object moving laterally across the field-of-view such that a plurality of reflected light beams are generated,
the photodetector array is configured to detect the plurality of reflected light beams, and
the at least one processor is configured to detect a variation in amplitude of the plurality of reflected light beams, and detect the dirt formation on the window structure based on the detected variation.

10. The LIDAR sensor module of claim 9, wherein a path of the object moving laterally across the field-of-view is parallel to a main surface of the window structure.

11. The LIDAR sensor module of claim 9, wherein:
the at least one processor is configured to detect a dim reflected light beam among the plurality of reflected light beams based on the detected variation, determine a lateral angular position of the scanning structure that corresponds to the dim reflected light beam, localize the dirt formation to a sub-area of the window structure according to the determined lateral angular position of the scanning structure, and activate a cleaning mechanism assigned to the sub-area to clean the sub-area of the window structure.

12. The LIDAR sensor module of claim 1, wherein the light detector includes a photodetector arranged in the transmitter compartment that is configured to generate an electrical signal based on the first reflected light beam, and the at least one processor is configured to receive the electrical signal and measure the first time-of-flight based on the electrical signal.

13. A method of detecting dirt on a window structure of a Light Detection and Ranging (LIDAR) sensor module, the method comprising:
transmitting a transmit light beam at a scanning structure arranged in a transmitter compartment of the LIDAR sensor module;
rotating the scanning structure about at least one scanning axis;
directing, by the scanning structure, the transmit light beam towards the window structure and a field-of-view;
detecting, within the transmitter compartment, a first reflected light beam that corresponds to the transmit light beam;
measuring a first time-of-flight of a first round trip light beam comprising of the transmit light beam and the first reflected light beam;
comparing the first time-of-flight to a first threshold time; and
detecting a dirt formation on the window structure on a condition that the first time-of-flight is less than the first threshold time.

14. The method of claim 13, further comprising:
monitoring an angular position of the scanning structure on the at least one scanning axis;
determining the angular position of the scanning structure that corresponds to a transmission time at which the transmit light beam is transmitted;
localizing the dirt formation to a sub-area of the window structure according to the determined angular position of the scanning structure; and
activating a cleaning mechanism assigned to the sub-area to clean the sub-area of the window structure.

15. The method of claim 13, further comprising:
detecting, within a receiver compartment of the LIDAR sensor module, a second reflected light beam that corresponds to the transmit light beam;
measuring a second time-of-flight of a second round trip light beam comprising of the transmit light beam and the second reflected light beam;
comparing the second time-of-flight to a second threshold time; and
detecting the dirt formation on the window structure on a condition that the second time-of-flight is less than the second threshold time.

16. The method of claim 15, further comprising:
monitoring at least one angular position of the scanning structure on the at least one scanning axis;
determining the at least one angular position of the scanning structure that corresponds to a transmission time at which the transmit light beam is transmitted;
localizing the dirt formation to a sub-area of the window structure according to the determined at least one angular position of the scanning structure; and
activating a cleaning mechanism assigned to the sub-area to clean the sub-area of the window structure.

17. The method of claim 15, further comprising:
transmitting the second reflected light beam from the transmitter compartment to the receiver compartment through an aperture of a separator structure that separates the receiver compartment from the transmitter compartment.

18. The method of claim 13, further comprising:
sequentially transmitting a plurality of transmit light beams;
directing the plurality of transmit light beams at different lateral positions in the field-of-view, wherein the plurality of transmit light beams are configured to hit an object moving laterally across the field-of-view such that a plurality of reflected light beams are generated;
detecting the plurality of reflected light beams;
detecting a variation in amplitude of the plurality of reflected light beams; and
detecting the dirt formation on the window structure based on the detected variation.

19. The method of claim 18, wherein a path of the object moving laterally across the field-of-view is parallel to a main surface of the window structure.

20. The method of claim 18, further comprising:
detecting a dim reflected light beam among the plurality of reflected light beams based on the detected variation;
determining a lateral angular position of the scanning structure that corresponds to the dim reflected light beam;
localizing the dirt formation to a sub-area of the window structure according to the determined lateral angular position of the scanning structure; and
activating a cleaning mechanism assigned to the sub-area to clean the sub-area of the window structure.

21. A Light Detection and Ranging (LIDAR) sensor module, comprising:
a receiver compartment;

a transmitter compartment;

a housing that houses the receiver compartment and the transmitter compartment, the housing comprising a window structure configured to permit a passage of transmitted light from the transmitter compartment into a field-of-view and permit a passage of received light from the field-of-view into the receiver compartment;

a transmitter arranged in the transmitter compartment and configured to transmit a transmit light beam;

a scanning structure arranged in the transmitter compartment and configured to rotate about at least one scanning axis, the scanning structure configured to receive the transmit light beam from the transmitter and direct the transmit light beam towards the window structure and the field-of-view;

a photodetector array arranged in the receiver compartment configured to detect a reflected light beam that corresponds to the transmit light beam; and at least one processor configured to measure a time-of-flight of a round trip light beam comprising of the transmit light beam and the reflected light beam, compare the time-of-flight to a threshold time, and detect a dirt formation on the window structure on a condition that the time-of-flight is less than the threshold time, wherein the at least one processor is configured to monitor at least one angular position of the scanning structure on the at least one scanning axis, determine the angular position of the scanning structure that corresponds to a transmission time at which the transmit light beam is transmitted, localize the dirt formation to a sub-area of the window structure according to the determined at least one angular position of the scanning structure, and activate a cleaning mechanism assigned to the sub-area to clean the sub-area of the window structure.

22. The LIDAR sensor module of claim 21, further comprising:

a separator structure interposed between the receiver compartment and the transmitter compartment in order to separate the receiver compartment and the transmitter compartment, wherein the separator structure includes an aperture configured to control a light leakage between the receiver compartment and the transmitter compartment.

23. The LIDAR sensor module of claim 22, wherein photodetector array is configured to receive the reflected light beam from the transmitter compartment via the aperture.

24. A Light Detection and Ranging (LIDAR) sensor module, comprising:

a housing comprising a window structure configured to permit a passage of transmitted light from inside the LIDAR sensor module into a field-of-view and permit a passage of received light from the field-of-view into an inside of the LIDAR sensor module;

a transmitter configured to sequentially transmit a plurality of transmit light beams;

a scanning structure configured to rotate about at least one scanning axis, the scanning structure configured to direct the plurality of transmit light beams at different lateral positions in the field-of-view, wherein the plurality of transmit light beams are configured to hit an object moving laterally across the field-of-view such that a plurality of reflected light beams are generated;

a photodetector array configured to detect the plurality of reflected light beams; and at least one processor configured to detect a variation in amplitude of the plurality of reflected light beams, and detect a dirt formation on the window structure based on the detected variation.

25. The LIDAR sensor module of claim 24, wherein a path of the object moving laterally across the field-of-view is parallel to a main surface of the window structure.

26. The LIDAR sensor module of claim 24, wherein:

the at least one processor is configured to detect a dim reflected light beam among the plurality of reflected light beams based on the detected variation, determine a lateral angular position of the scanning structure that corresponds to the dim reflected light beam, localize the dirt formation to a sub-area of the window structure according to the determined lateral angular position of the scanning structure, and activate a cleaning mechanism assigned to the sub-area to clean the sub-area of the window structure.

27. The LIDAR sensor module of claim 24, wherein:

the at least one processor is configured to monitor for a dim reflected light beam among the plurality of reflected light beams based on the detected variation, and the at least one processor is configured to detect the dirt formation in response to detecting the dim reflected light beam.

28. The LIDAR sensor module of claim 27, wherein the at least one processor is configured to measure an amplitude of each reflected light beam of the plurality of reflected light beams, compare each amplitude to a threshold value, and detect the dim reflected light beam on a condition that one of the amplitudes is less than the threshold value.

29. The LIDAR sensor module of claim 28, wherein the at least one processor is configured to calculate an average amplitude of the plurality of reflected light beams and set the threshold value to be less than the average amplitude.

* * * * *